US005912713A

United States Patent [19]

Tsunoda et al.

[11] Patent Number: 5,912,713

[45] Date of Patent: Jun. 15, 1999

[54] DISPLAY CONTROL APPARATUS USING DISPLAY SYNCHRONIZING SIGNAL

[75] Inventors: Takashi Tsunoda; Hideo Kanno, both of Yokohama; Katsuhiro Miyamoto, Isehara; Yuichi Matsumoto, Tokyo; Hideaki Yui, Kawasaki, all of Japan

[73] Assignee: Canon Kabushiki Kaisha, Tokyo, Japan

[21] Appl. No.: 08/364,779

[22] Filed: Dec. 27, 1994

[30] Foreign Application Priority Data

Dec. 28, 1993 [JP] Japan .................................... 5-337379

[51] Int. Cl.[6] ...................................................... G03B 13/00

[52] U.S. Cl. ........................... 348/540; 348/526; 345/213

[58] Field of Search .................................... 348/500, 505, 348/510, 512, 521, 529, 544, 547, 540, 526; 375/376, 375; 331/1 R, 17, 18, 20, 21, 25, 34, 32; 327/100, 155, 156, 160; 345/218, 213

[56] References Cited

U.S. PATENT DOCUMENTS

| | | | |
|---|---|---|---|
| 4,795,239 | 1/1989 | Yamashita et al. | 350/333 |
| 4,809,068 | 2/1989 | Nagai | 358/148 |
| 4,812,783 | 3/1989 | Honjo et al. | 331/20 |
| 4,827,341 | 5/1989 | Akimoto et al. | 348/526 |
| 4,843,471 | 6/1989 | Yazawa et al. | 348/716 |
| 5,068,731 | 11/1991 | Takeuchi | 348/581 |
| 5,124,621 | 6/1992 | Srivastava | 348/540 |
| 5,184,350 | 2/1993 | Dara | 370/105.3 |
| 5,185,603 | 2/1993 | Medin | 340/814 |
| 5,202,906 | 4/1993 | Saito et al. | 331/14 |
| 5,353,041 | 10/1994 | Miyamoto et al. | 345/97 |

FOREIGN PATENT DOCUMENTS

| | | | |
|---|---|---|---|
| 0544245 | 6/1993 | European Pat. Off. . | |
| 0622775 | 11/1994 | European Pat. Off. . | |
| 62-256521 | 11/1987 | Japan . | |
| 39615 | 1/1991 | Japan . | |

*Primary Examiner*—Victor R. Kostak

*Attorney, Agent, or Firm*—Fitzpatrick, Cella, Harper & Scinto

[57] ABSTRACT

A horizontal synchronizing signal is applied as a reference signal and a voltage-controlled oscillator outputs a display clock signal on the basis of the frequency of the horizontal synchronizing signal. The frequency of the display clock signal is frequency-divided in accordance with a frequency-dividing value selected from among a plurality of frequency-dividing signals stored in advance, the difference in frequency between the frequency-divided display clock signal and the horizontal synchronizing signal and the phase difference between them are obtained by a phase comparator, and the frequency of the signal outputted by the voltage-controlled oscillator is decided in dependence upon the frequency difference. In an interval in which a vertical synchronizing signal turns off and the frequency of the horizontal synchronizing signal fluctuates, the reference signal and the horizontal synchronizing signal input to the phase comparator are held fixed to prevent a fluctuation in the outputted display clock.

28 Claims, 9 Drawing Sheets

DISPLAY CONTROL APPARATUS USING DISPLAY SYNCHRONIZING SIGNAL

BACKGROUND OF THE INVENTION

This invention relates to a display control apparatus and, more particularly, to a display control apparatus for presenting a display by generating a signal having a divided frequency on the basis of the frequency of a reference signal.

A well-known example of a circuit which, on the basis of the frequency of a given reference signal, generates a signal whose frequency is a frequency-divided of the reference frequency is an oscillator circuit referred to as a PLL (phase-locked loop) which compares the reference signal and the output signal in terms of both frequency and phase and performs control in such a manner that the input signal and a frequency signal outputted by a VCO (voltage-controlled oscillator) maintain a phase difference that is proportional to the difference between the free oscillation frequency of the VCO and the frequency of the input signal. In a PLL circuit of this kind, the output signal from the VCO is frequency-divided by a prescribed dividing value (a preset value), after which the frequency and phase of the resulting signal are compared with the frequency and phase of the reference signal. For example, in a display apparatus, a horizontal synchronizing signal is adopted as the reference signal and a PLL circuit of the above-mentioned type is used to multiply the frequency of the reference signal and generate the synchronizing clock of a video signal.

However, there are display apparatus in which the horizontal synchronizing signal serving as the reference signal is outputted at a frequency different from that at the time of the display operation in intervals where a vertical synchronizing signal is off, by way of example. In case of such an apparatus, the fact that the conventional PLL circuit can be preset to only one dividing value means that the PLL circuit will not operate normally during the time that the vertical synchronizing signal is off. The result is an increase in jitter or failure of the PLL circuit to lock the output signal.

SUMMARY OF THE INVENTION

Accordingly, an object of the present invention is to provide a display control apparatus in which, even if a reference signal has a plurality of frequencies, is capable of outputting a display clock signal that is stable with respect to changes in frequency by changing the frequency-dividing value in conformity with the frequency of the reference signal.

Another object of the present invention is to provide a display control apparatus in which, when a display clock signal is generated using a horizontal synchronizing signal as a reference signal, is capable of preventing disturbance of the display even if the frequency of the horizontal synchronizing signal fluctuates in a blank interval.

A further object of the present invention is to provide a display control apparatus in which operation of a PLL circuit used in a display control circuit is assured.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the accompanying drawings.

Figure 1:
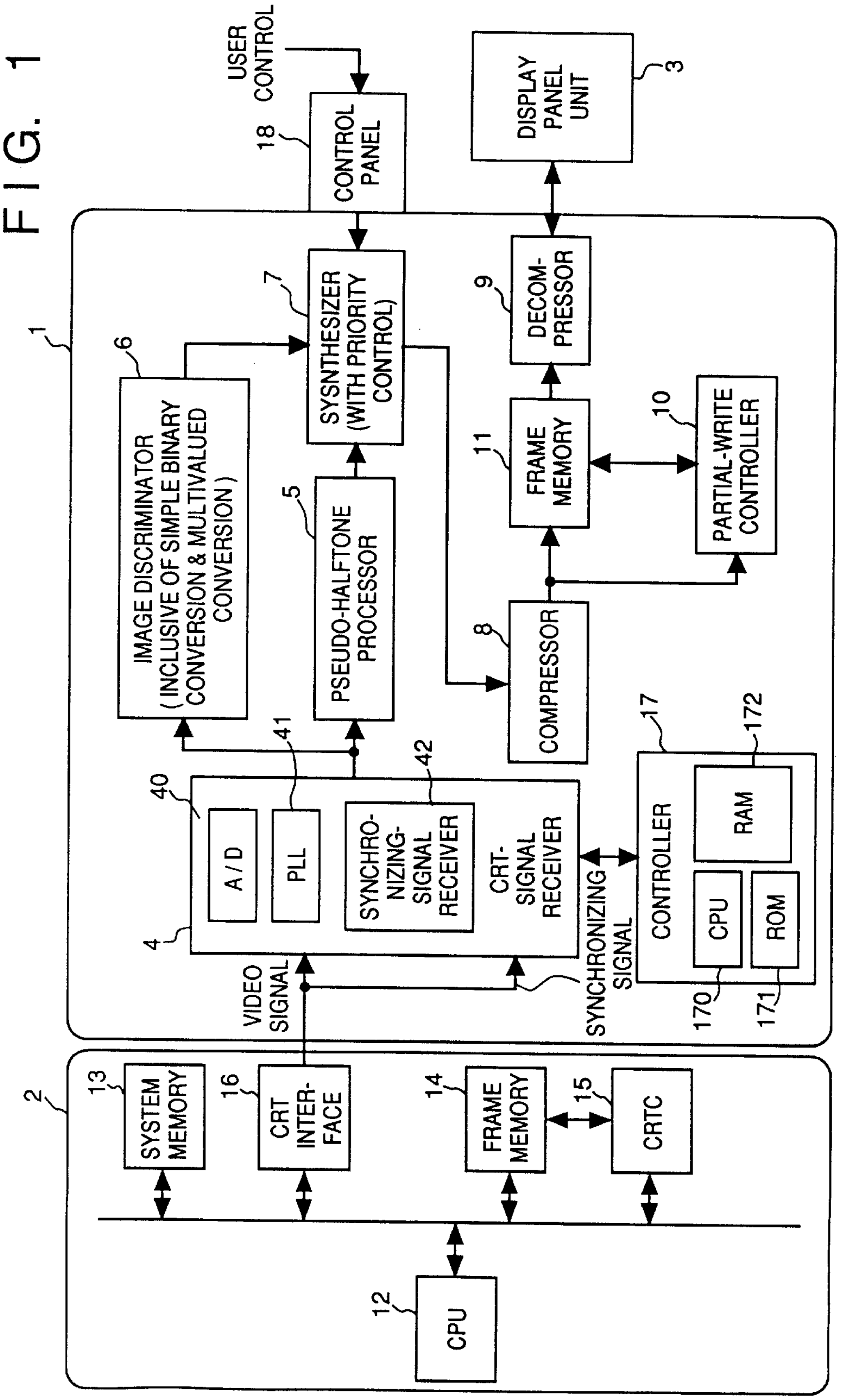
FIG. 1 is a block diagram illustrating an information processing system having a display control apparatus according to an embodiment of the present invention.

FIG. 1 is a block diagram illustrating an information processing system having a display control apparatus according to an embodiment of the present invention.

The system of FIG. 1 includes a display control apparatus 1 according to this embodiment, a computer 2 such as a personal computer or work station serving as an information source for supplying the display control apparatus 1 with information, and a display panel unit 3 for displaying image information under the control of the display control apparatus 1. Though not illustrated, the display control panel 3 includes a drive circuit for driving a display panel, a control circuit for controlling drive under conditions ideal for the display panel, a panel back-light and a power supply. The display control apparatus 1 has a CRT-signal receiver 4 which receives CRT display signals (image signal and synchronizing signals) outputted by the computer 2, converts these signals to signals suited to the components of the next stage and then outputs the signals.

Since CRT signals from an ordinary computer are analog video signals, the CRT-signal receiver 4 is internally provided with an A/D converter 40, a PLL circuit 41 which generates a sampling clock for the A/D conversion, and a synchronizing-signal receiver 42. Image information converted to a digital signal by the A/D converter 40 of the CRT-signal receiver 4 is applied to a pseudo-halftone processor 5, which executes pseudo-halftone processing for subjecting the image information to a binary or multivalued conversion. Methods of binary and multivalued pseudo-halftone processing are as follows:

Error-Diffusion Method

According to this method, weighting is applied to a binary or multivalued error produced when peripheral pixels of a pixel of interest (where the peripheral pixels are pixels which prevail before the pixel of interest is processed) are binarized or converted to multiple values, after which the resulting weighted value is added to the pixel of interest and binarization is performed using a fixed threshold value.

Mean-Density Preservation Method

According to this method, the binarization threshold value is not fixed. Rather, the threshold value is decided by a weighted mean obtained from already binarized data neighboring the pixel of interest, and the threshold value is capable of being varied depending upon the state of the pixels.

Pseudo-halftone processing can be executed using at least one of these methods. It is also possible to provide means for executing more than one of these methods and changeover between the means as by allowing the user to make the selection.

The image information outputted by the CRT-signal receiver 4 is sent to an image discriminator 6, which is capable of executing simple binarization processing or multivalued-conversion processing. The image discriminator 6 separates portions of the image from the input image information that should not be subjected to binarizing halftone processing. These portions include characters, fine lines, etc. The image discriminator 6 includes a processor for executing simple binarization processing in cases where binarizing halftone processing is not performed. An example of a method of image discrimination carried out by the image discriminator 6 is as follows:

Luminance Discriminating Method

One method of separating a luminance signal is to separate an image based upon the magnitude of the luminance value of the CRT image signal. In general, characters and fine lines displayed by a computer represent important image information and therefore the luminance thereof is comparatively high. Accordingly, portions of high luminance are identified in the CRT image signal and the luminance signals of these portions are separated.

A synthesizer (with a switching-priority function) 7 superimposes the data obtained by the pseudo-halftone processor 5 and simple binarized data obtained by the image discriminator 6. Image information of portions determined to be characters or fine lines by the image discriminator 6 are subjected to simple binarization at a higher priority. Implementation of this priority function can be changed over by the user.

When the binary data that has been subjected to binarizing pseudo-halftone processing by the synthesizer 7 is stored in a frame memory 11, a compressor 8 compresses the binary data to reduce the volume of data so that the capacity of the frame memory 11 can be kept small. A decompressor 9 decompresses one frame of binary data stored in the frame memory 11. A partial-write controller 10 detects a portion which has undergone a change in a frame of image data displayed on the display panel unit 3 and outputs the data of the changed portion to the display panel unit 3 at a higher priority. This function makes it possible to give higher priority to the display of portions of image data that have changed. The frame memory 11 stores the image data displayed on the display panel unit 3. A controller 17 controls the operation of each component constructing the display control apparatus 1. The connections to these components is not illustrated. The controller 17 includes a CPU 170, a ROM 171 storing the control program of the CPU 170 as well as various data, and a RAM 172 used as the work area of the CPU 170. A control panel 18, which includes various keyboards and pointing devices, enters control data and commands on the basis of operations performed by the user.

The construction of the computer 2 will now be described.

The computer 2 includes a CPU 12 which controls the computer, and a system memory 13 which stores the control program of the CPU 12 as well as various data. The system memory 13 is also used as the work area of the CPU 12 and saves a variety of data temporarily. The computer 2 also has a frame memory 14 which stores image data processed by the computer 2,.a CRT controller (CRTC) 15 for controlling transmission of the image information stored in the frame memory 14 to the display control apparatus 1, and a CRT interface 16 for converting image information stored in the frame memory 14 to CRT signals. The conversion includes conversion of analog signals, color conversion, etc.

Operation of the components shown in FIG. 1 will now be described on the basis of the arrangement set forth above.

First, the computer 2, which is a source of image information, outputs the image information that has been stored in the frame memory 14 as the CRT signals via the CRT interface 16 under the control of the CRTC 15. The CRT signals are divided up into a video signal (e.g., three analog signals R, G, B in case of a color signal; one analog signal in case of a monochromatic display) and synchronizing signals (signals, inclusive of horizontal and vertical synchronizing signals, for partitioning the video signal line by line or frame by frame).

The CRT signals enter the CRT-signal receiver 4 of the display control apparatus 1. The video signal is converted to a digital signal (comprising a plurality of bits) by the A/D converter 40. The sampling clock at the time of the A/D conversion is produced by the PLL circuit 41, which frequency-divides the horizontal synchronizing signal sent from the computer 2. The resulting digital signal enters the pseudo-halftone processor 5, where by the video signal is converted to binary or multivalued data. In order to convert the CRT signal from the computer 2 whenever required in the conversion procedure executed at this time, the conversion is performed in non-interlaced fashion. Distribution of error for pseudo-halftone processing and calculation of the threshold value can be carried out according to theory. As a result, the reproducibility of the image data that has been subjected to halftone processing is improved.

The digital signal (image information) from the CRT-signal receiver 4 simultaneously enters the image discriminator 6, where portions of the signal not suited to pseudo-halftone processing, such as the aforesaid characters and fine lines, are identified, and only these portions are subjected to simple binarization or simple multivalued conversion and then outputted. The binary or multivalued signal obtained by the pseudo-halftone processor 5 and image discriminator 6 is switched to in the synthesizer 7 and the result is delivered from the synthesizer 7 to the compressor 8. The changeover in the synthesizer 7 is carried out in such a manner that the simple binary signal or simple multivalued signal obtained by the image discriminator 6 is outputted preferentially. The priority of changeover in the synthesizer 7 may be implemented by the display control apparatus 1 itself on the basis of a command or the like entered by the operator using the control panel 18 or forcibly in response to an instruction from the computer 2. This priority processing is particularly useful in a case where it is desired to display characters or fine lines preferentially or in a case where it is desired to display a natural picture such as a photograph preferentially.

The compressor 8 compresses the signal from the synthesizer 7 and outputs the compressed signal to the frame memory 11. Since partial-write control by the partial-write controller 10 is controlled in line units, a desirable compression method is one which performs compression in line units. The signal thus compressed by the compressor 8 is sent to the partial-write controller 10 at the same time. Here a compressed signal of at least the preceding frame is read out of the frame memory 11 and the read signal is compared with the signal just sent from the compressor 8. The partial-write controller 10 detects the line of a pixel for which a difference between the preceding image signal and the present image signal has been detected and performs control in such a manner that this line signal and line information (line-image compressed signal) are preferentially outputted to the decompressor 9 from the frame memory 11. The compressed image signal thus sent to the decompressor 9 is demodulated (decompressed) by the decompressor 9 and then outputted to the display panel unit 3. The latter accepts the line-unit image signal from the display control apparatus 1 and displays image information in dependence upon the line image information and line signal.

When all of the input video signals are subjected to pseudo-halftone processing for the sake of a binary or multivalued conversion in a case where the painting speed of display panel unit 3 is lower than the input transfer speed of the video signal that enters from the display control apparatus 1, none of the signals converted to binary or multivalued signals can be displayed. Since this means that the pseudo-halftone processor 5 will be executing needless processing, the input video signals are entered upon being thinned out in frame units in dependence upon the painting speed of the display panel unit 3.

As a result, the time during which pseudo-halftone processing is performed for the sake of the binary or multivalued conversion may be increased by an amount of time equivalent to the frames thinned out, and therefore the processing speed of pseudo-halftone processing may be lowered. Accordingly, even if it is desired to fabricate the pseudo-halftone processor 5, which is for the binary or multivalued conversion, as an IC, there is no need for the operating speed thereof to be very high. This makes it possible to prevent the generation of heat and the occurrence of erroneous operation caused by circuitry capable of high-speed operation.

The construction of the PLL circuit 41 of CRT-signal receiver 4 will now be described with reference to FIG. 2.

Figure 2:
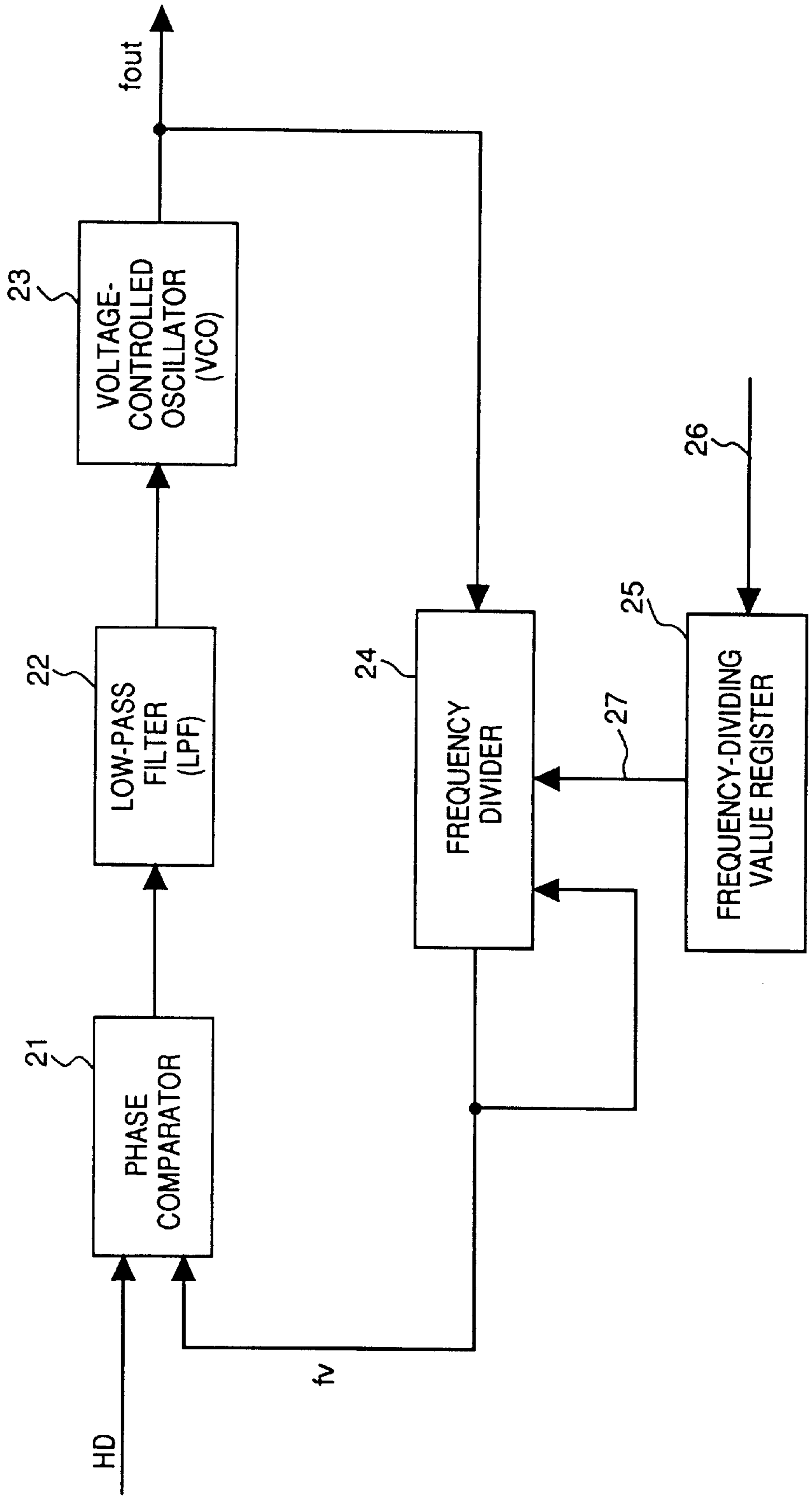
FIG. 2 is a block diagram illustrating the construction of a PLL circuit of a CRT-signal receiver according to a first embodiment of the present invention.

FIG. 2 is a block diagram illustrating the construction of the PLL circuit 41 contained in the CRT-signal receiver 4 of this embodiment.

A horizontal synchronizing signal HD which enters from the computer 2 is fed into a phase comparator 21. A signal fv enters the other input terminal of the phase comparator 21. The phase comparator 21 senses the frequencies of these two input signals (HD, fv) as well as the phase difference between them, generates an average DC voltage proportional to the error (difference) between the signals and delivers the DC voltage to a low-pass filter (LPF) 22. The error signal is applied to the control terminal of a voltage-controlled oscillator (VCO) 23 through the low-pass filter. The frequency of the output signal $f_{OUT}$ of the VCO 23 is varied in a direction which reduces the difference between frequencies of the reference signal (HD) and VCO 23 as well as the phase difference between them. The voltage-controlled oscillator (VCO) 23 generates a signal $f_{OUT}$ (a pixel synchronizing signal or dot clock signal) on the basis of the DC voltage entering from the low-pass filter 22. The signal FoUT produced by the voltage-controlled oscillator 23 is frequency-divided by a frequency divider 24 on the basis of a value in a dividing-value register 25, and the resulting signal is fed back to the phase comparator 21 as the signal fv. By adopting this arrangement, the desired frequency signal $f_{OUT}$ (which has been frequency-divided in conformity with the value in the register 25) can be obtained from the voltage-controlled oscillator 23 on the basis of the reference signal (horizontal synchronizing signal HD).

It should be noted that the dividing value in the register 25 is set at the start. The setting method is to write in the value by the CPU 170 of the controller 17 via a signal line 26. The dividing value that has been written in the register 25 is controlled on the basis of the signal fv. When the signal fv becomes logical "0", the dividing value in the register 25 is written in the divider 24 again via a signal line 27. The frequency divider 24 frequency-divides the output signal $f_{OUT}$ (which corresponds to a frequency-division of the horizontal synchronizing signal HD) of the voltage-controlled oscillator 23 by the prescribed dividing value and outputs the signal fv as the result. Thereafter, the phase comparator 21 compares the frequency of the reference signal (horizontal synchronizing signal HD) with the frequency of the phase signal fv, and applies phase locking. As a result, in a case where the value in the dividing-value register 25 is N, the frequency of the output signal $f_{OUT}$ from the voltage-controlled oscillator 23 is locked at a frequency which is N times the frequency of the reference signal (horizontal synchronizing signal HD).

Second Embodiment

Figure 3:
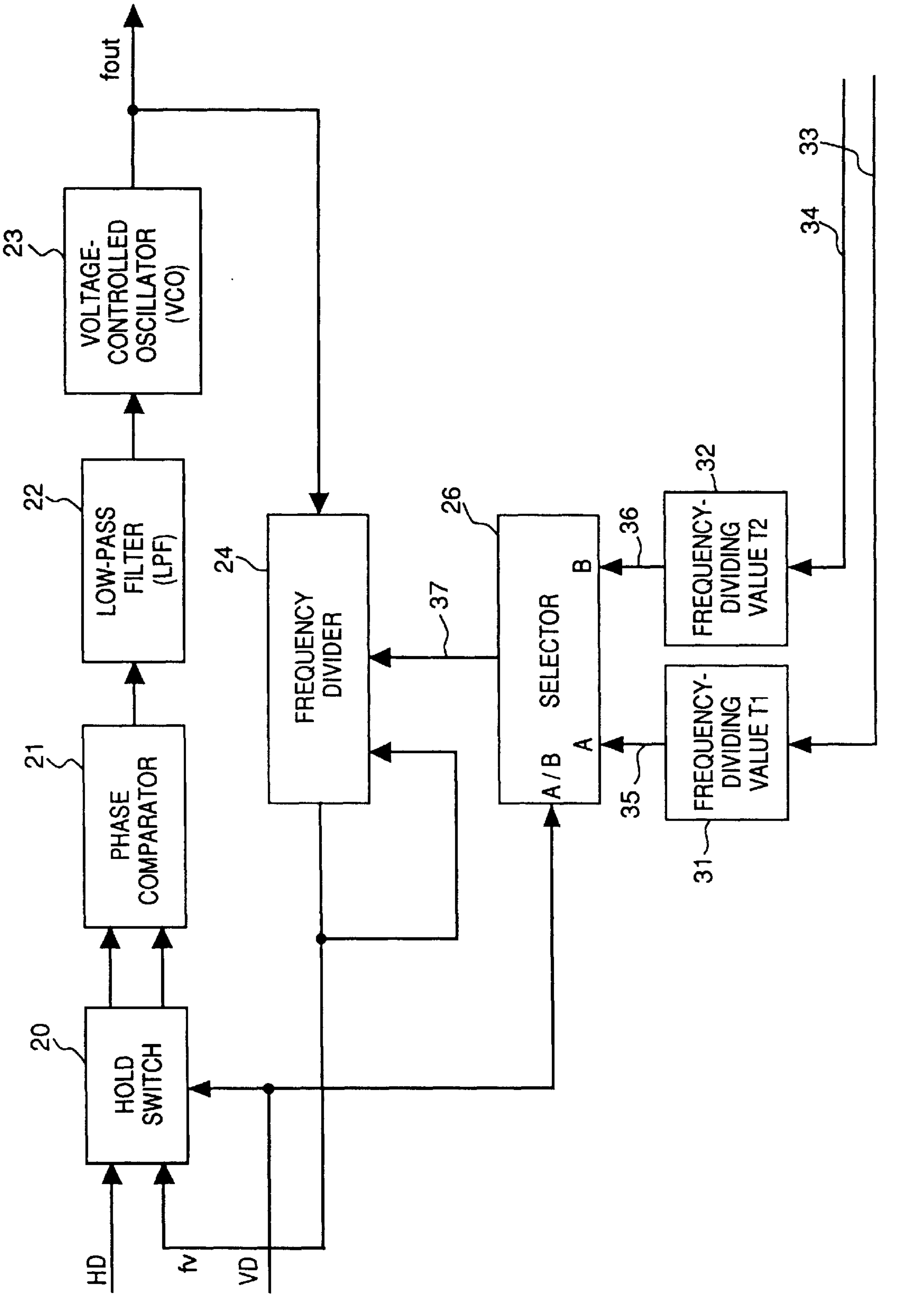
FIG. 3 is a block diagram illustrating the construction of a PLL circuit of a CRT-signal receiver according to a second embodiment of the present invention.

FIG. 3 is a block diagram illustrating the construction of the PLL circuit 41 according to a second embodiment of the present invention. In a case where the horizontal synchronizing signal HD is outputted during the time that a vertical synchronizing signal VD is at a low level (i.e., in blank intervals) and, moreover, the period of the horizontal synchronizing signal is short, the frequency-dividing ratio is changed over in dependence upon the level of the vertical synchronizing signal VD to deal with a change in the frequency of the horizontal synchronizing signal HD in order to prevent a phase shift in the phase comparator 21.

In FIG. 3, the controller 17.sets frequency-dividing values T1, T2 in frequency-dividing value registers 31, 32 via signal lines 33, 34, respectively, when power is introduced from the power supply. Output signal lines 35, 36 of these registers 31, 32 are connected to a selector 26. The selector 26 selects the signal on the signal line 35 or 36 in dependence upon a control signal (vertical synchronizing signal VD) and delivers the signal to the frequency divider 24 via the signal line 37. For example, when the control signal (vertical synchronizing signal VD) is logical "1", the frequency-dividing value T1 in the register 31 is delivered to the signal line 37 via the signal line 35 and selector 26, whereby the T1 is set in the frequency divider 24. When the control signal (vertical synchronizing signal VD) is logical "0" (the blank interval), the frequency-value T2 (T2>T1) in register 32 is selected and set in the frequency divider 24 via the signal line 37.

The operation of the PLL circuit 41 shown in FIG. 3 is basically the same as that of the circuit shown in FIG. 2 described above. With the PLL circuit of FIG. 3, however, the two frequency-dividing values (T1, T2) are stored in advance and the two values are switched between in dependence upon the level of the control signal (vertical synchronizing signal VD). At the same time, a hold switch 20 is turned qff (opened) only in an interval in which the vertical synchronizing signal VD is at logical "0" (the blank interval), as a result of which output of the signal to the phase comparator 21 is interrupted. The hold switch 20, whose inputs are the reference signal HD and the signal fv from the frequency divider 24, outputs these signals to the phase comparator 21 in dependence upon the control signal (VD). When the control signal is in an interval of logical "0", the hold switch 20 holds the status of the output which prevailed immediately before this interval. As a result, in the blank interval, the level of the signal sent from the phase comparator 21 to the voltage-controlled oscillator 23 via the low-pass filter 22 is held in the state which prevailed just before the opening of the hold switch 20. (This is the holding state.) In other words, even in the holding state, the clock signal fout supplied to the system does not fluctuate since the input to the control terminal of the voltage-controlled oscillator 3 is constant. The clock signal $f_{OUT}$ may thus be supplied stably.

Figure 4:
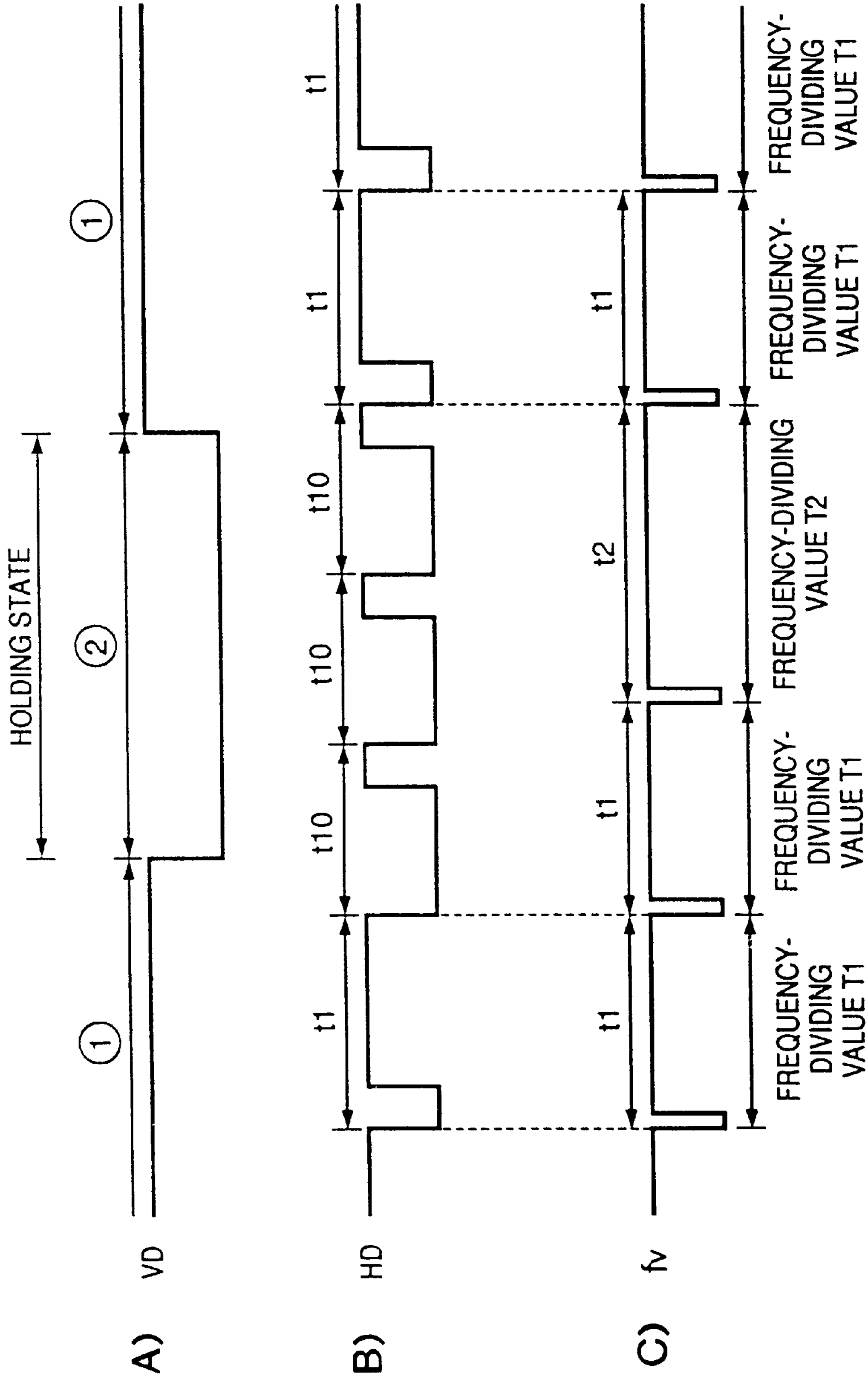
FIG. 4 is a timing chart showing the operation of the circuit of FIG. 3.

FIG. 4 is a timing chart illustrating the operation timing of the circuit shown in FIG. 3. The timing chart shows the timing for switching between the frequency-dividing values T1, T2.

The PLL circuit 41 operates at a period t1 when the signal level of the control signal (vertical synchronizing signal VD) is logical "1" (which corresponds to interval ① in FIG. 4), and at a period t2 when the signal level of the control signal (vertical synchronizing signal VD) is logical "0" (which corresponds to interval ② in FIG. 4). The timing at which the frequency-dividing value T1 or T2 is loaded in the frequency divider 24 from the frequency-dividing register 31 or 32 is that at which the signal level of the signal fv is logical "0". Here the horizontal synchronizing signal HD is outputted at the period t1 when the vertical synchronizing signal VD is at the high level (logical "1") and at a period t10 (t10>t1) when the vertical synchronizing signal VD is at the low level (logical "0").

If the signal level of the control signal (vertical synchronizing signal VD) is logical "1", then the hold switch 20 outputs the signal HD and the signal fv to the phase comparator 21 as is. At the same time, the frequency divider 24 outputs the signal fv, whose frequency is a multiple of that of the signal $f_{OUT}$ in accordance with the frequency-dividing value T1, since the value T1 in the frequency-dividing value register 31 has been selected by the selector 26. When the signal fv becomes logical "1" in this interval, the frequency-dividing value T1 (period t1) selected by the selector 26 is loaded in the frequency divider 24 again.

By contrast, if the signal level of the control signal (vertical synchronizing signal VD) is logical "0", then the hold switch 20 is turned off so that the output signals to the phase comparator 21 are cut off. As a result, the output of the low-pass filter 22 assumes the holding state. Thus, the signal level which prevailed prior to turn-off of the hold switch 20 is kept applied to the voltage-controlled oscillator 23. The frequency of the signal $f_{OUT}$ does not change and the signal $f_{OUT}$ of stabilized frequency continues to be outputted. At this time the selector 26 selects the frequency-dividing value T2 (period t2) of the register 32 and delivers the value T2 to the frequency divider 24. Thus, the frequency-dividing values T1, T2 are set in conformity with the signal level of the control signal (vertical synchronizing signal VD) and the PLL circuit 41 operates in dependence upon this frequency-dividing value.

The reason for changing over the frequency-dividing value of the frequency divider 24 from T1 to T2 when the vertical synchronizing signal VD is in the off interval (interval ②) is to change the frequency of the signal fv in conformity with the frequency t10 of the horizontal synchronizing signal HD in the interval ②, thereby changing the value held in the hold switch 20 in interval ② as opposed to interval ①. As a result, the phase difference of the signals applied to the phase comparator 21 is reduced and fluctuation of the output from the phase comparator 21 can be suppressed even when the interval returns to the interval ①. This means that the frequency of the clock signal $f_{OUT}$ will not be disturbed.

Modification of Second Embodiment

Figure 5:
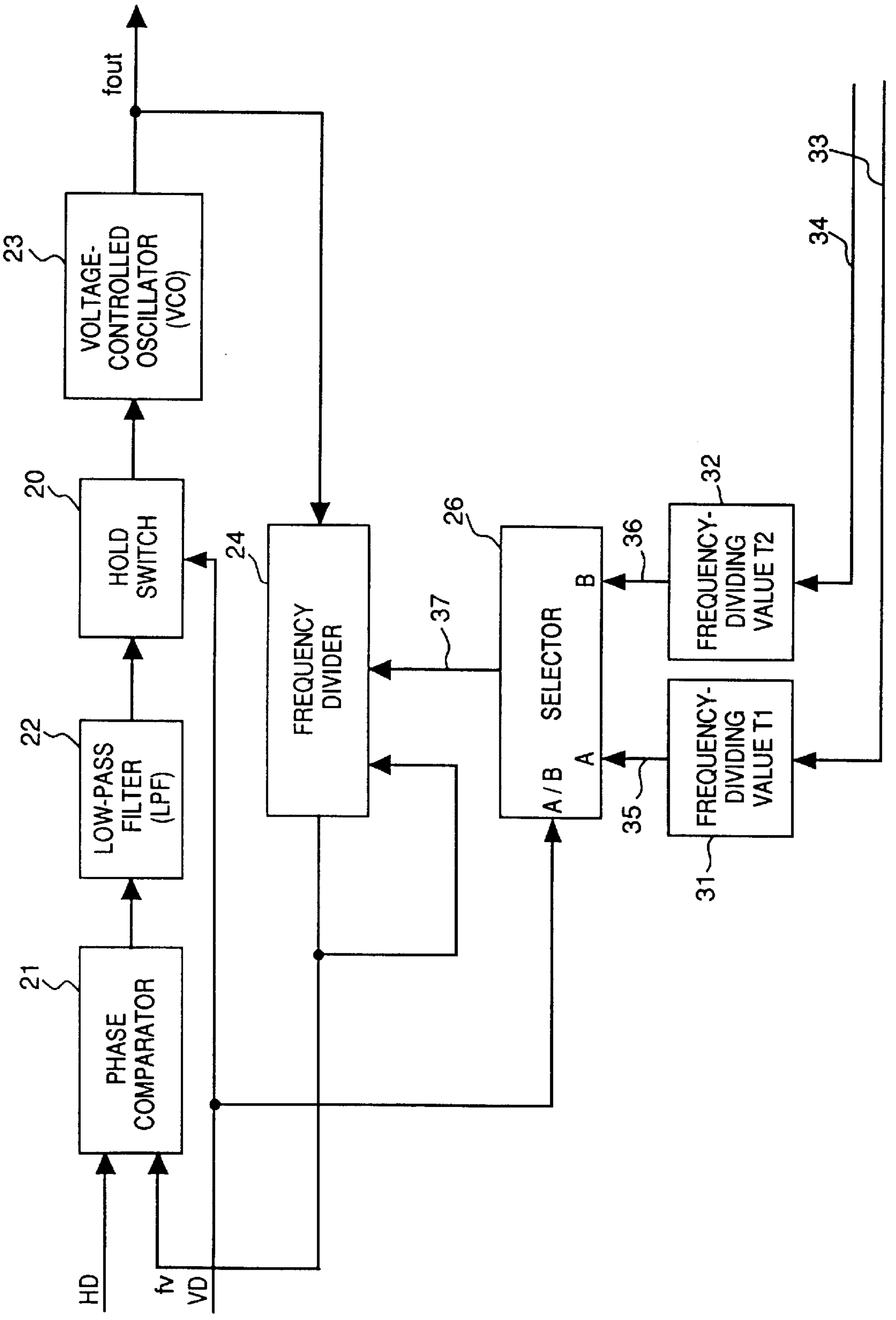
FIG. 5 is a block diagram illustrating the construction of a PLL circuit of a CRT-signal receiver according to a modification of the second embodiment of the present invention.

FIG. 5 is a block diagram illustrating the construction of the PLL circuit according to a modification of the second embodiment of the present invention. Though the construction and operation of this circuit are similar to those of the circuit shown in FIG. 3, this arrangement differs in that the hold switch 20 is provided between the low-pass filter 22 and the voltage-controlled oscillator 23.

More specifically, in the holding state (interval ② in FIG. 4), the signal input to the voltage-controlled oscillator 23 is maintained at the voltage level which prevailed just before attainment of the holding state, even if there is a disturbance in the phases of the reference input signal (horizontal synchronizing signal HD) and the signal fv applied to the phase comparator 21. As a result, the output signal $f_{OUT}$ of the voltage-controlled oscillator 23 is stable and it is possible to supply a stabilized clock to the system even in the blank intervals.

Third Embodiment

Figure 6:
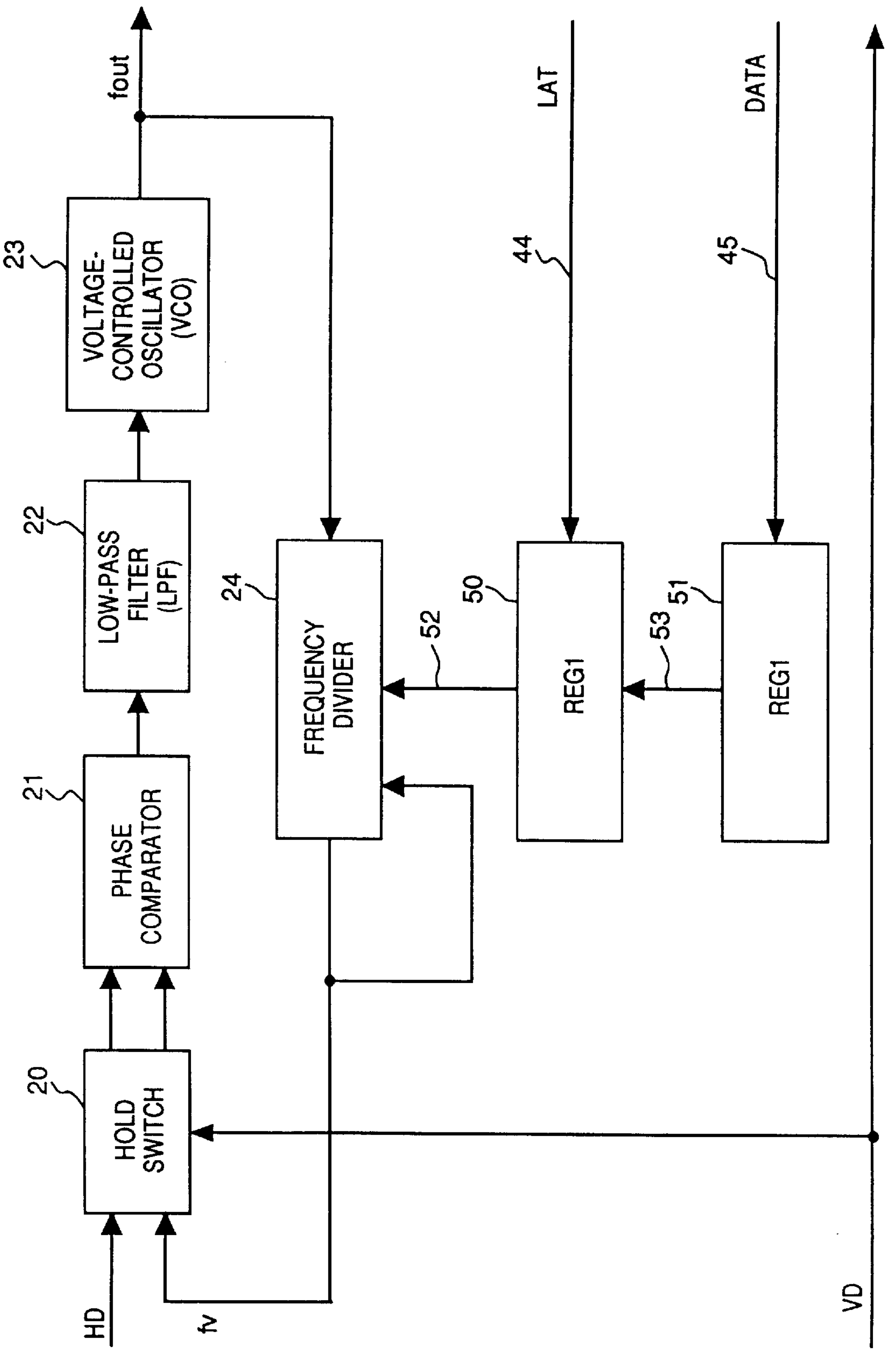
FIG. 6 is a block diagram illustrating the construction of a PLL circuit according to a third embodiment of the present invention.
Figure 7:
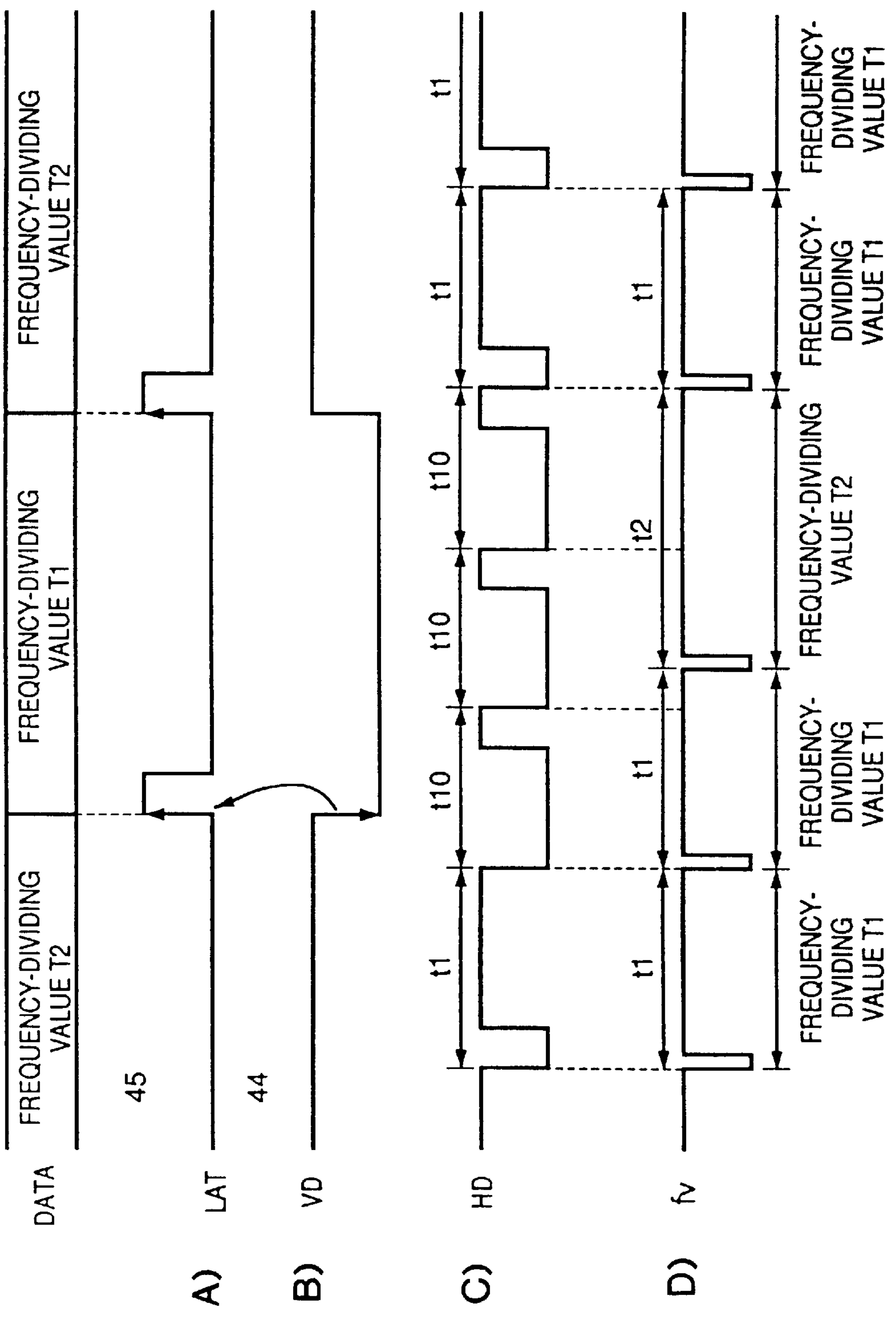
FIG. 7 is a timing chart showing the operation of the circuit of FIG. 6.

FIG. 6 is a block diagram illustrating the construction of the PLL circuit in the display control apparatus according to a third embodiment of the present invention, and FIG. 7 is a timing chart showing the operation of the PLL circuit. It should be noted that components identical with those of the foregoing drawings are designated by like reference characters and need not be described again.

The horizontal synchronizing signal HD is a reference input signal and the signal fv is a signal obtained by frequency-dividing the output $f_{OUT}$ of the voltage-controlled oscillator 23 by means of the frequency divider 24. The signal fv basically is a signal having a frequency the same as that of the reference input signal (horizontal synchronizing signal HD). The hold switch 20, whose inputs are the reference input signal HD and the signal fv, controls whether or not these signals are outputted to the phase comparator 21. The signal HD and the signal fv are allowed to pass to the phase comparator 21 as is when the control signal (vertical synchronizing signal VD) is logical "1" and are cut off when the control signal VD is logical "0". This is the same as in the foregoing embodiments.

The frequency-dividing value (T1) in a register (REG1) 50 is loaded in the frequency divider 24 via signal line 52 when the signal level of the control signal (vertical synchronizing signal VD) is in the logical "1" interval. The loading timing is the interval in which the signal fv is logical "0". When the control signal (vertical synchronizing signal VD) is logical "0", the second frequency-dividing value T2 stored in a register (REG2) 51 is loaded in the register 50 via signal line 53 in response to a latch signal (LAT) 44 outputted by the controller 17.

Thereafter, the frequency-dividing value (T2) is loaded in the frequency divider 24 via the signal line 52 and, at the same time, the frequency-dividing value T1 is written in the register 51 from the controller 17 via a data line (DATA) 45. The frequency-dividing value T1 is shifted to the register 50 by the latch signal (LAT) 44 from the controller 17 when the control signal (vertical synchronizing signal VD) changes from logical "0" to logical "1". Thus, the next frequency-dividing value is always set in the register 51 in advance and control is performed to change over the frequency-dividing value in dependence upon the signal level of the control signal (vertical synchronizing signal VD), thereby making it possible to operate the PLL circuit stably.

In the timing chart of FIG. 7 showing the operation of the circuit of FIG. 6, it is assumed that the phase of the input reference signal (horizontal synchronizing signal HD) and the phase of the signal fv whose phase is compared with that of the reference signal are in agreement (the locked state). When the signal fv is logical "0" in an interval in which the level of the control signal (vertical synchronizing signal VD) is logical "1", the frequency-dividing value T1 is set in the frequency divider 24 from the register 50. Further, the frequency-dividing value T2 to be set in the interval in which the control signal (vertical synchronizing signal VD) is logical "0" is set in the register 51 in advance.

The controller 17 monitors the signal level of the control signal (vertical synchronizing signal VD) at all times. When the level of the VD signal changes from logical "1" to logical "0", the controller 17 outputs the latch signal 44. As a result, the frequency-dividing value T2 in register 51 is loaded in the register 50 via the signal line 53. At the same time, the controller 17 sets the frequency-dividing value T1 in the register 51 through the data line 45.

The frequency-dividing value T1 is a frequency-dividing value (T1) for operating the PLL circuit 41 in the interval in which the signal level of the control signal (vertical synchronizing signal VD) is logical "1", just as in the embodiments described above. Thus, the PLL circuit 41 is operated at period t2 in the interval in which the signal level of the control signal (vertical synchronizing signal VD) is logical "0" and at the period t1 when the signal level of the control signal (vertical synchronizing signal VD) is logical "1".

Further, in the interval in which the control signal (vertical synchronizing signal VD) is logical "0", transmission of the input reference signal HD and signal fv to the phase comparator 21 is halted by the hold switch 20, whereby the outputs of the phase comparator 21 and low-pass filter 22 are held in a fixed state (the DC state). Thus, stabilized operation can be achieved.

Figure 8:
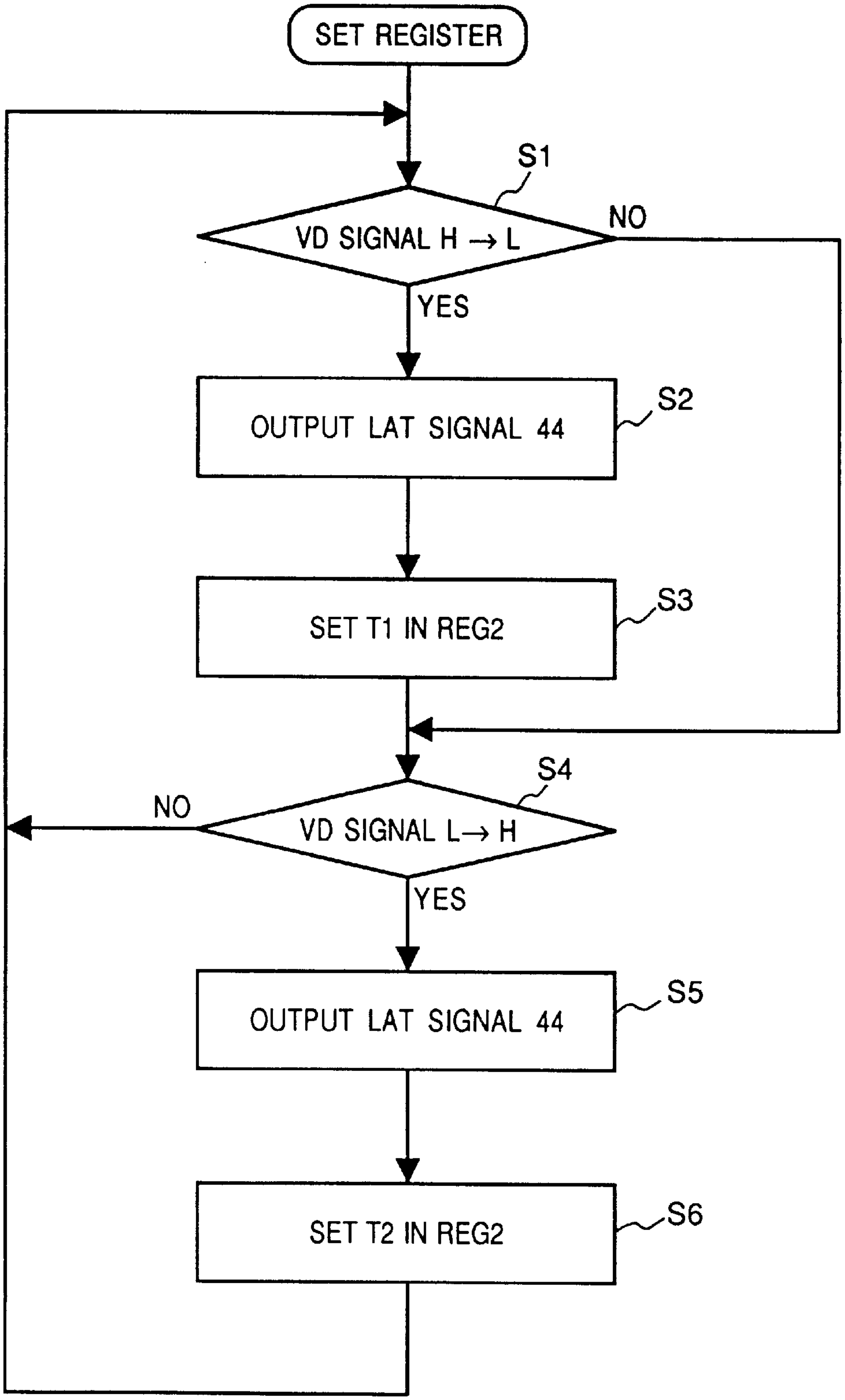
FIG. 8 is a flowchart illustrating processing for setting a register of a controller according to the third embodiment.

FIG. 8 is a flowchart showing the operation for setting data in the registers 50 and 51 by the controller 17 of the display control apparatus 1 of this embodiment. The control program for executing this processing is stored in the ROM 171. It should be noted that the frequency-dividing values T1 are T2 are assumed to have been set in the registers 50 and 51, respectively, before the start of this processing.

First, at step S1, it is determined whether the vertical synchronizing signal (VD) has changed from logical "1" (the high level) to logical "0" (the low level). If the decision rendered is "YES", then the program proceeds to step S2, at which the latch signal (LAT) 44 is outputted and the frequency-dividing value (T2) stored in the register (REG2) 51 is set in the register (REG1) 50. As a result, the frequency-dividing value of the frequency divider 24 changes to T2 at the negative-going transition of the next signal fv. The program then proceeds to step s3, at which the frequency-dividing value (T2) prevailing when the display is blank is set in the register 51.

Next, at step S4, it is determined whether the vertical synchronizing signal (VD) has changed from the low level to the high level. If the decision rendered is "YES", then the program proceeds to step S5, at which the latch signal 44 is outputted and the frequency-dividing value (T1) stored in the register 51 is set in the register (REG1) 50. The program then proceeds to step S6, at which the frequency-dividing value (T2) prevailing when the display is blank is set in the register 51.

Figure 9:
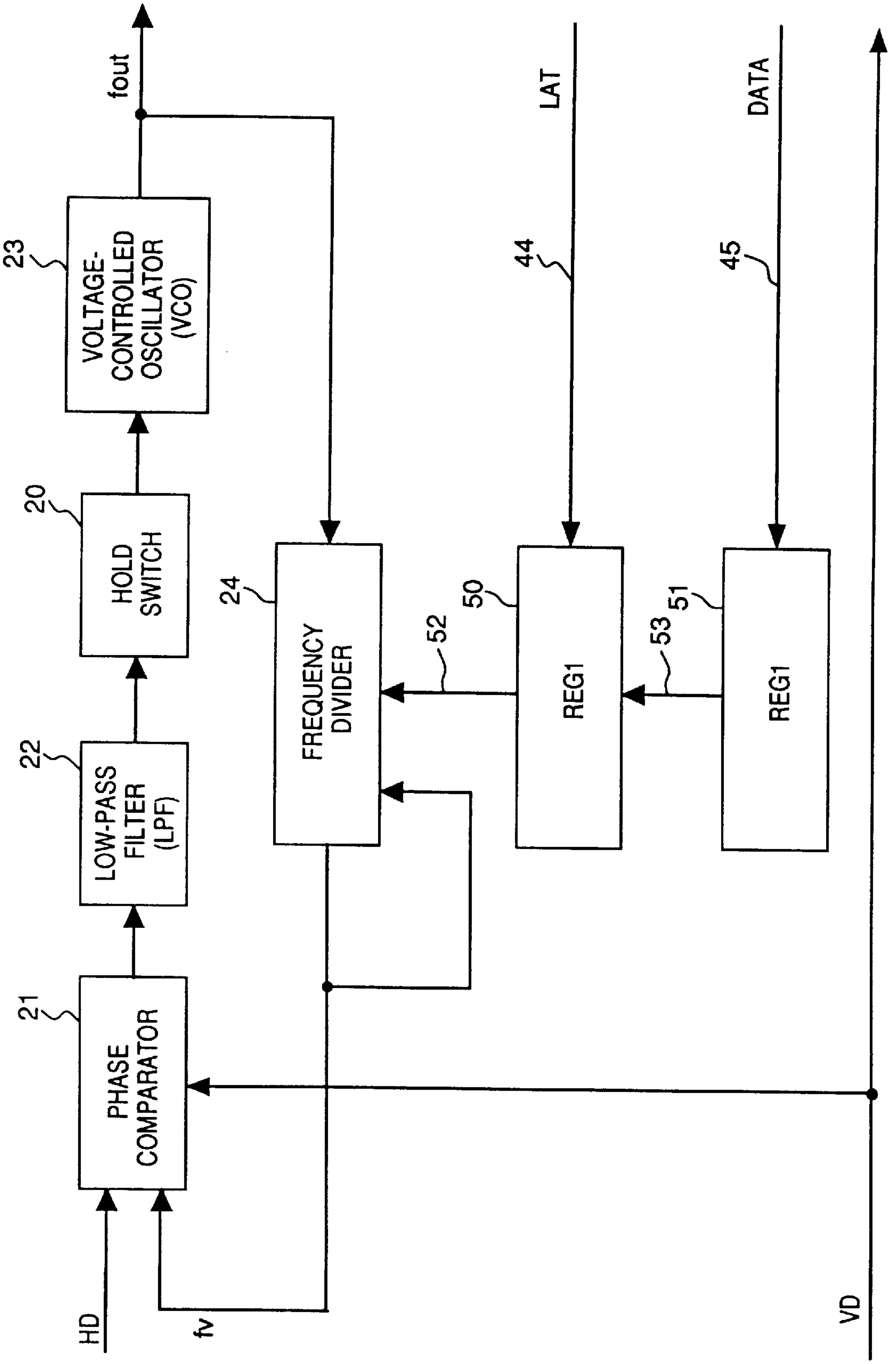
FIG. 9 is a block diagram illustrating the construction of a PLL circuit of a CRT-signal receiver according to a modification of the third embodiment of the present invention.

FIG. 9 illustrates a modification of the third embodiment. This arrangement differs from that of FIG. 6 in that the hold switch 20 is provided between the low-pass filter 22 and the voltage-controlled oscillator 23.

The basic operation of this circuit is similar to that described in connection with FIGS. 6 and 7 of the third embodiment. Here, however, the hold switch 20 allows the signal from the low-pass filter 22 to pass to the voltage-controlled oscillator 23 when the control signal (vertical synchronizing signal VD) is in the interval of logical "1" and blocks the signal from the low-pass filter 22 when the control signal (vertical synchronizing signal VD) is logical "0". In this case, the input signal level of the voltage-controlled oscillator 23 is held at a constant voltage level by the hold switch 20. As a result, the dot clock signal $f_{OUT}$ supplied to the system does not fluctuate and is outputted as a stable signal at all times. Other operations of this circuit are basically the same as those described above.

In accordance with this embodiment as described above, when a PLL circuit is operated, frequency-dividing values corresponding to respective frequencies are set so that it is possible to deal with a situation in which signals having different frequencies enter as the reference signal. As a result, an increase in jitter or an unlocked state, which are problems encountered in PLL circuits, can be prevented. This makes it possible to operate the system in a stable state.

The present invention can be applied to a system constituted by a plurality of devices or to an apparatus comprising a single device. Furthermore, it goes without saying that the invention is applicable also to a case where the object of the invention is attained by supplying a program to a system or apparatus.

Thus, in accordance with the present invention as described above, a stabilized display clock can be outputted, even if a reference signal has a plurality of frequencies, by changing the frequency-multiplying value in conformity with the frequency.

As many apparently widely different embodiments of the present invention can be made without departing from the spirit and scope thereof, it is to be understood that the invention is not limited to the specific embodiments thereof except as defined in the appended claims.

What is claimed is:

1. A display control apparatus for generating a display clock signal, which corresponds to a video signal, from a reference signal, comprising:

frequency dividing means for dividing the frequency of the display clock signal in dependence upon a frequency-dividing value;

memory means for storing a plurality of frequency-dividing values;

setting means for selecting any one of the plurality of frequency-dividing values, which have been stored in said memory means, in dependence upon a display synchronizing signal and setting the selected value in said frequency-dividing means;

comparator means for comparing a frequency-divided signal produced by said frequency dividing means with the reference signal;

clock generating means for generating the display clock signal on the basis of results of comparison performed by said comparator means; and holding means for holding an input to said clock generating means at a prescribed value in dependence upon the display synchronizing signal.

2. The apparatus according to claim 1, further comprising interrupting means for interrupting an output from said comparator means, said interrupting means being controlled so as to interrupt the output from said comparator means when an image on a display screen is changed over.

3. The apparatus according to claim 1, wherein the reference signal is a horizontal synchronizing signal.

4. The apparatus according to claim 1, wherein the display synchronizing signal is a vertical synchronizing signal.

5. The apparatus according to claim 2, wherein said interrupting means interrupts the output from said comparator means when the vertical synchronizing signal is off.

6. The apparatus according to claim 1, wherein said setting means changes over the selected frequency-dividing value selected when the vertical synchronizing signal is off and on.

7. A display control apparatus for generating a display clock signal, which corresponds to a video signal, from a reference signal, comprising:

memory means for storing a first value and a second value;

selecting means for selecting the first value stored in said memory means in a case where a display synchronizing signal is in a first state, and for selecting the second value stored in said memory means in a case where the display synchronizing signal is in a second state;

frequency dividing means for dividing a frequency of the display clock signal by the first or second value selected by said selecting means;

switch means for supplying the reference signal and a frequency divided signal from said frequency dividing means in a case where the display synchronizing signal is in the first state, and for holding and supplying output signals in a case where the display synchronizing signal is in the second state, wherein the output signals correspond to the reference signal and the frequency divided signal in a previous first state before the display synchronizing signal has changed from the first state to the second state;

comparator means for comparing the frequency dividing signal with the reference signal outputted by said switch means; and clock generating means for generating the display clock signal on the basis of results of comparison performed by said comparator means.

8. The apparatus according to claim 7, wherein, the first state is a state when the display synchronizing signal is off, and the second state is a state when the display synchronizing signal is on.

9. The apparatus according to claim 8, further comprising converting means for converting results of the comparison from said comparator means into a voltage signal and smoothing said voltage signal.

10. The apparatus according to claim 8, wherein the display synchronizing signal is a vertical synchronizing signal.

11. A display control apparatus for generating a display clock signal, which corresponds to a video signal, from a reference signal, comprising:

frequency dividing means for dividing the frequency of the display clock signal in dependence upon a frequency-dividing value;

memory means for storing a plurality of frequency-dividing values;

setting means for selecting any one of the plurality of frequency-dividing signal, which have been stored in said memory means, in dependence upon a display synchronizing signal and setting the selected value in said frequency-dividing means;

comparator means for comparing a frequency-divided signal produced by said frequency dividing means with the reference signal and outputting results of the comparison in the form of a voltage signal;

switch means, to which the voltage signal is applied as an input, for outputting the voltage signal in dependence upon the display synchronizing signal; and clock generating means for generating a display clock signal having a frequency conforming to the voltage signal.

12. The apparatus according to claim 11, further comprising smoothing means for smoothing the voltage signal outputted by said comparator means.

13. The apparatus according to claim 11, wherein, when the display synchronizing signal is off, said switch means holds and outputs the voltage signal which prevailed when the display synchronizing signal was changed over from on to off, and when the display synchronizing signal is on, said switch means outputs its input voltage signal as is.

14. The apparatus according to claim 11, wherein the display synchronizing signal is a vertical synchronizing signal.

15. A display control method for generating a display clock signal, which corresponds to a video signal, from a reference signal, comprising the steps of:

selecting a first value stored in a memory in a case where a display synchronizing signal is in a first state;

selecting a second value stored in the memory in a case where the display synchronizing signal is in a second state;

frequency dividing a frequency of the display clock signal by the selected first or second value;

supplying the reference signal and the frequency divided signal as output signals in a case where the display synchronizing signal is in the first state;

holding and supplying output signals in a case where the display synchronizing signal is in the second state, wherein the output signals correspond to the reference signal and the frequency divided signal in a previous first state before the display synchronizing signal has changed from the first state to the second state;

comparing the frequency divided signal with the reference signal outputted in the supplying step or in the holding and supplying step; and generating the display clock signal on the basis of results of the comparison.

16. The method according to claim 15, wherein, the first state is a state when the display synchronizing signal is off, and the second state is a state when the display synchronizing signal is on.

17. The method according to claim 15, further comprising the step of converting results of the comparison into a voltage signal and smoothing the voltage signal.

18. The method according to claim 15, wherein the display synchronizing signal is a vertical synchronizing signal.

19. A display control apparatus for generating a display clock signal which corresponds to a video signal supplied from an external device, from a reference signal, comprising:

a display unit;

memory means for storing a first value and a second value;

selecting means for selecting the first value stored in said memory means in a case where a display synchronizing signal is in a first state, and for selecting the second value stored in said memory means in a case where the display synchronizing signal is in a second state;

frequency dividing means for dividing a frequency of the display clock signal by the first or second value selected by said selecting means;

switch means for supplying the reference signal and a frequency divided signal from said frequency dividing means as output signals in a case where the display synchronizing signal is in the first state, and for holding and supplying output signals in a case where the display synchronizing signal is in the second state, wherein the output signals correspond to the reference signal and the frequency divided signal in a previous first state before the display synchronizing signal has changed from the first state to the second state;

comparator means for comparing the frequency divided signal with the reference signal outputted by said switch means; and clock generating means for generating the display clock signal on the basis of results of the comparison performed by said comparator means.

20. The apparatus according to claim 19, wherein the first state is a state when the display synchronizing signal is off, and the second state is a state when the display synchronizing signal is on.

21. The apparatus according to claim 19, further comprising converting means for converting results of the comparison from said comparator means into a voltage signal and smoothing said voltage signal.

22. The apparatus according to claim 19, wherein the display synchronizing signal is a vertical synchronizing signal.

23. The apparatus according to claim 19, wherein said display unit is a ferroelectric liquid crystal display unit.

24. A display control apparatus for generating a display clock signal which corresponds to a video signal, from a reference signal, comprising:

supply means for supplying a video signal and a synchronizing signal of the video signal;

memory means for storing a first value and a second value;

selecting means for selecting the first value stored in said memory means in a case where a display synchronizing signal is in a first state, and for selecting the second value stored in said memory means in a case where the display synchronizing signal is in a second state;

frequency dividing means for dividing a frequency of the display clock signal by the first or second value selected by said selecting means;

switch means for supplying the reference signal and a frequency divided signal from said frequency dividing means as output signals in a case where the display synchronizing signal is in the first state, and for holding and supplying an output signal in a case where the display synchronizing signal is in the second state, wherein the output signals correspond to the reference signal and the frequency divided signal in a previous first state before the display synchronizing signal has changed from the first state to the second state;

comparator means for comparing the frequency divided signal with the reference signal outputted by said switch means; and clock generating means for generating the display clock signal on the basis of results of the comparison performed by said comparator means.

25. The apparatus according to claim 24, wherein, the first state is a state when the display synchronizing signal is off, and the second state is a state when the display synchronizing signal is on.

26. The apparatus according to claim 24, further comprising converting means for converting results of the comparison from said comparator means into a voltage signal and smoothing said voltage signal.

27. The apparatus according to claim 24, wherein the display synchronizing signal is a vertical synchronizing signal.

28. The apparatus according to claim 24, wherein said supply means includes a personal computer.

* * * * *

UNITED STATES PATENT AND TRADEMARK OFFICE

CERTIFICATE OF CORRECTION

PATENT NO. : 5,912,713

DATED : June 15, 1999

INVENTOR(S) : Tsunoda et al.

It is certified that error appears in the above-identified patent and that said Letters Patent is hereby corrected as shown below:

COLUMN 6:

Line 2, "signal FoUT" should read --signal $f_{out}$--.

COLUMN 7:

Line 2, "qff" should read --off--.
Line 16, "signal fout" should read --signal $f_{out}$--.

COLUMN 8:

Line 5, "②as" should read --② as--.
Line 21, "②in" should read --② in--.

COLUMN 9:

Line 63, "step s3," should read --step S3,--.

UNITED STATES PATENT AND TRADEMARK OFFICE

CERTIFICATE OF CORRECTION

PATENT NO. : 5,912,713

DATED : June 15, 1999

INVENTOR(S) : Tsunoda et al.

It is certified that error appears in the above-identified patent and that said Letters Patent is hereby corrected as shown below:

COLUMN 12:

Line 4, "signal," should read --values--.

Signed and Sealed this

Seventh Day of March, 2000

Attest:

Q. TODD DICKINSON

Attesting Officer

*Commissioner of Patents and Trademarks*